United States Patent
Tysowski (10) Patent No.: US 8,122,024 B2
(45) Date of Patent: Feb. 21, 2012

(54) METHOD AND SYSTEM FOR STORING MULTIPLE GEO-TAGGED MEDIA FILES AND RENDERING THE SAME

(75) Inventor: Piotr Konrad Tysowski, Waterloo (CA)

(73) Assignee: Research In Motion Limited, Waterloo (CA)

( * ) Notice: Subject to any disclaimer, the term of this patent is extended or adjusted under 35 U.S.C. 154(b) by 408 days.

(21) Appl. No.: 12/333,680

(22) Filed: Dec. 12, 2008

(65) Prior Publication Data

US 2010/0153386 A1  Jun. 17, 2010

(51) Int. Cl.
  G06F 7/00 (2006.01)
  G06F 17/30 (2006.01)
(52) U.S. Cl. ...................................................... 707/736
(58) Field of Classification Search .......... 707/600–831; 715/201, 853
  See application file for complete search history.

(56) References Cited

U.S. PATENT DOCUMENTS

| | | | |
|---|---|---|---|
| 2004/0186854 A1* | 9/2004 | Choi | 707/104.1 |
| 2005/0108643 A1* | 5/2005 | Schybergson et al. | 715/713 |
| 2007/0100834 A1* | 5/2007 | Landry et al. | 707/10 |
| 2008/0101762 A1* | 5/2008 | Kellock et al. | 386/52 |
| 2008/0205205 A1* | 8/2008 | Chiang et al. | 369/30.04 |
| 2008/0250431 A1* | 10/2008 | Lee et al. | 719/328 |

OTHER PUBLICATIONS

Risto Sarvas et al., Metadata creation system for mobile images, Jun. 2004, ACM, 36-48.*

* cited by examiner

*Primary Examiner* — Jean B Fleurantin
(74) *Attorney, Agent, or Firm* — Moffat & Co.

(57) ABSTRACT

A method and apparatus for organizing a geographically tagged media file, the method obtaining geographical information for the media file; identifying a subfolder for the media file; and placing the media file in the identified subfolder. Also, a method and apparatus for utilizing an album of geographically tagged media files within a media application, the method allowing a third party application access to the geographically tagged media files; and upon selection of the third party application within the media application, launching the third party application populated with the album of geographically tagged media files.

16 Claims, 8 Drawing Sheets

METHOD AND SYSTEM FOR STORING MULTIPLE GEO-TAGGED MEDIA FILES AND RENDERING THE SAME

FIELD OF THE DISCLOSURE

The present disclosure relates to photographs or media files, and in particular to photographs or media files which contain geographical information. The disclosure further relates to storage of the photographs or media files, and to media or mapping applications for rendering the files.

BACKGROUND

Currently it is possible to geo-tag or geo-code a photograph in order to provide geographic information for the photograph. Commonly, this is done using a camera with a built-in GPS receiver, where the camera adds geographic coordinates such as latitude and longitude to the metadata of the photograph. Alternatives, however, could include inserting altitude and bearing, accuracy data and place names. Also, photographs can be geo-tagged subsequent to the taking of the photograph and this could be utilized if the camera itself does not have the specific geo-tagging capabilities.

An example of the use of geo-tagged photographs is within the Google Earth™ application in which the "gallery" option could be selected to show various icons or thumb nails for multi-media files such as pictures or videos which are geo-tagged to a particular location on the map. Selecting one of the pictures or other media files provides the user with a larger version of the thumbnail or if a thumbnail is not used then a copy of a higher resolution picture, or video among others. One restriction with Google Earth™ is that a user must manually upload photographs the user wishes to add to the program.

A problem exists on mobile devices where the computing environment is less than a personal computer. Further, on mobile devices, multiple geo-tagged photographs can exist and organization of these geo-tagged photographs is presently not performed well.

BRIEF DESCRIPTION OF THE DRAWINGS

The present disclosure will be better understood with reference to the drawings in which.

DETAILED DESCRIPTION

The present disclosure provides a method for organizing a geographically tagged media file comprising; obtaining geographical information for the media file; identifying a subfolder for the media file; and placing the media file in the identified subfolder.

The present disclosure further provides a method for utilizing an album of geographically tagged media files within a media application, the method comprising: allowing a third party application access to the geographically tagged media files; and upon selection of the third party application within the media application, launching the third party application populated with the album of geographically tagged media files.

The present disclosure further provides a mobile device configured for organizing a geographically tagged media file comprising: memory; and a processor configured to: obtain geographical information for the media file; identify a subfolder within the memory for the media file; and place the media file in the identified subfolder.

The present disclosure still further provides a mobile device configured to utilize an album of geographically tagged media files within a media application, the mobile device comprising: a user interface; and a processor configured to: allow a third party application access to the geographically tagged media files; and upon selection of the third party application within the media application, launch the third party application populated with the album of geographically tagged media files.

Geo-tagged or geo-coded photographs include location information within the photograph itself. As used herein, geo-tagged and geo-coded could mean the same thing and are interchangeable terms.

The location information for the photograph can, for example, be a latitude and longitude that the photograph was taken. Other geographic information such as bearing and speed from a particular point, a triangulation from known broadcast towers, among other information is within the scope of the present disclosure.

Figure 1:
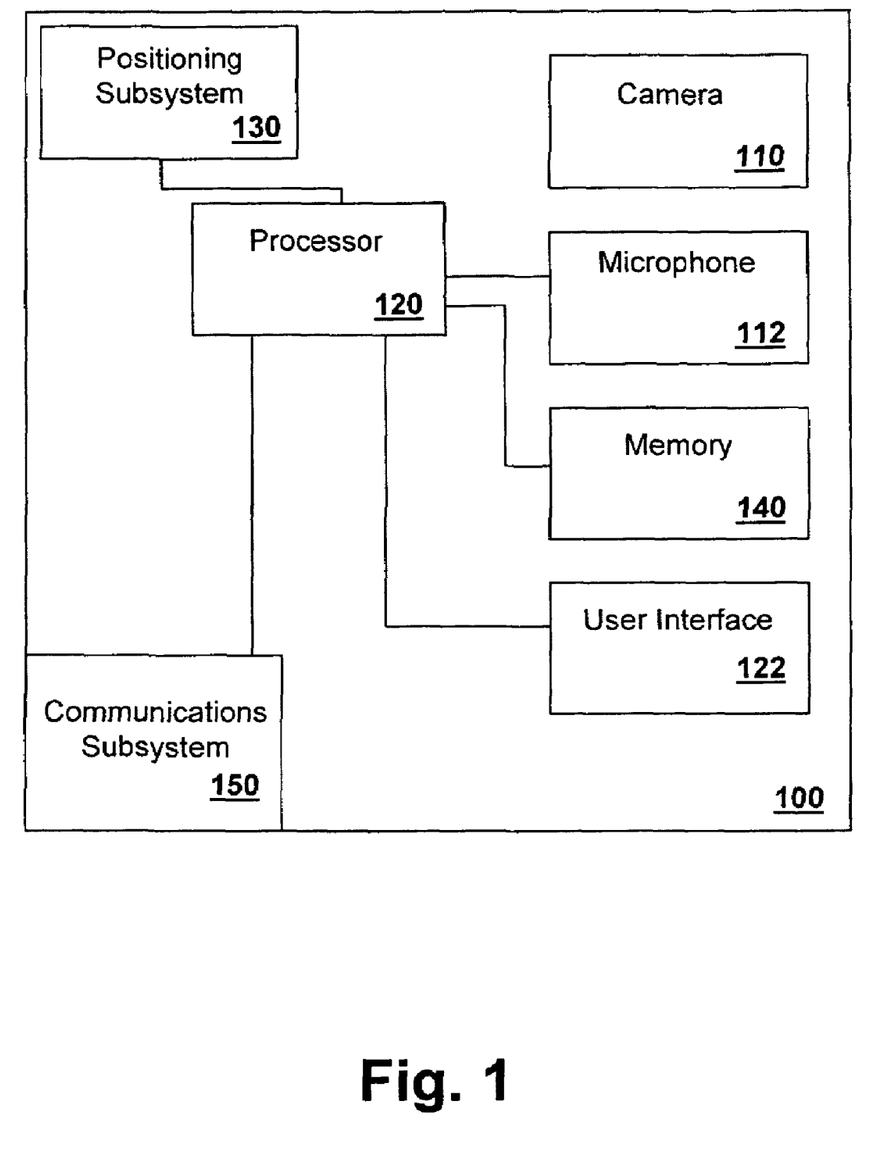
FIG. 1 is a block diagram of a simplified mobile device.

Reference is now made to FIG. 1. FIG. 1 shows a simplified mobile device 100 that is capable of performing the methods described herein.

In mobile device 100, a camera 110 is adapted to take photographs. In alternative embodiments, camera 110 may be a video camera as opposed to a still camera. In further alternative embodiments, instead of visual images, other multimedia formats are supported. For example, a microphone 112 could be utilized to create geo-tagged audio files. Other multimedia files would be apparent to those in the art.

A processor 120 controls the operation of a mobile device and could control when camera 110 takes a picture. For example, a user interface 122 connected through processor 120 could be used to initiate the taking of a picture on camera 110 when a button is pressed.

Mobile device 100 further includes a positioning subsystem 130. Such positioning subsystems are known in the art and could include, for example, a chip and an antenna, which receives information from the various global positioning satellites around the earth. In alternative embodiments, positioning subsystem 130 could include a vectoring system to extrapolate from various base stations to determine the location of mobile device 100. Other options for recording the position of mobile device 100 would be known to those in the art.

Positioning subsystem 130 provides a processor 120 with the location of the device when requested by processor 120.

A typical operation of mobile device 100 may be that a user wishes to take a picture. As such, the user uses user interface 122 to press a button to initiate a picture through camera 110. Processor 120 instructs the camera 110 to take the picture and receives data from camera 110. Processor 120 may then append or include positioning information into the picture file, the positioning information being derived from the positioning subsystem 130. The tagging of the photograph can, for example, use a standard (exchangeable image file) EXIF tag inside the photo file. The exchangeable image file format is a standard for storing interchangeable information in image files, especially those using JPEG compression.

The information could be added as metadata to the photo file.

The above use could also be used for audio files, where a user trigger a recording from microphone 112 using user interface 122. Processor 120 could append positioning information from positioning subsystem 130 to the audio file.

Similarly, camera 110 could be a video camera. As used herein, a photograph is an example of a media file, but is not meant to be limiting, and other media files could be substituted for the photograph in the examples below.

Processor 120 could then store the tagged image in memory 140.

If mobile device 100 is a communications device, a communication subsystem 150 could additionally be used as described below.

In alternative embodiments, mobile device 100 may received geo-tagged photographs via communications subsystem 150. This may be in addition to, or in place of, the use of camera 110. As such, in alternative embodiments camera 100 and positioning subsystem 130 are optional on mobile device 100.

A geo-tagged photograph may be useful, for example, for viewing the photograph within a mapping application. For example, it may be possible to view the location of the photo on a map when viewing it in a media application by invoking a map client to render a pushpin on a map display. In current applications, however, it may be difficult to browse multiple photos on the map display. This capability would be useful, for example, when browsing through a photo collection taken at various places during vacation, to view multimedia photos of real estate properties within a city, among other options.

Further, there is no currently good way to create photo layers on the map, nor to center a map and adjust the size of a map based on a group of photographs.

The present disclosure provides a way to browse through multiple photo locations on a map. When browsing a folder library containing multiple photo files in the photo browser application, a menu command may be utilized to allow the user to populate the map. Upon invocation, a map is displayed, populated with the landmark pushpins or thumbnails to correspond with the location of the photos within a current folder.

Thus, one aspect of the present disclosure is the organization of photographs in a folder system.

Figure 2:
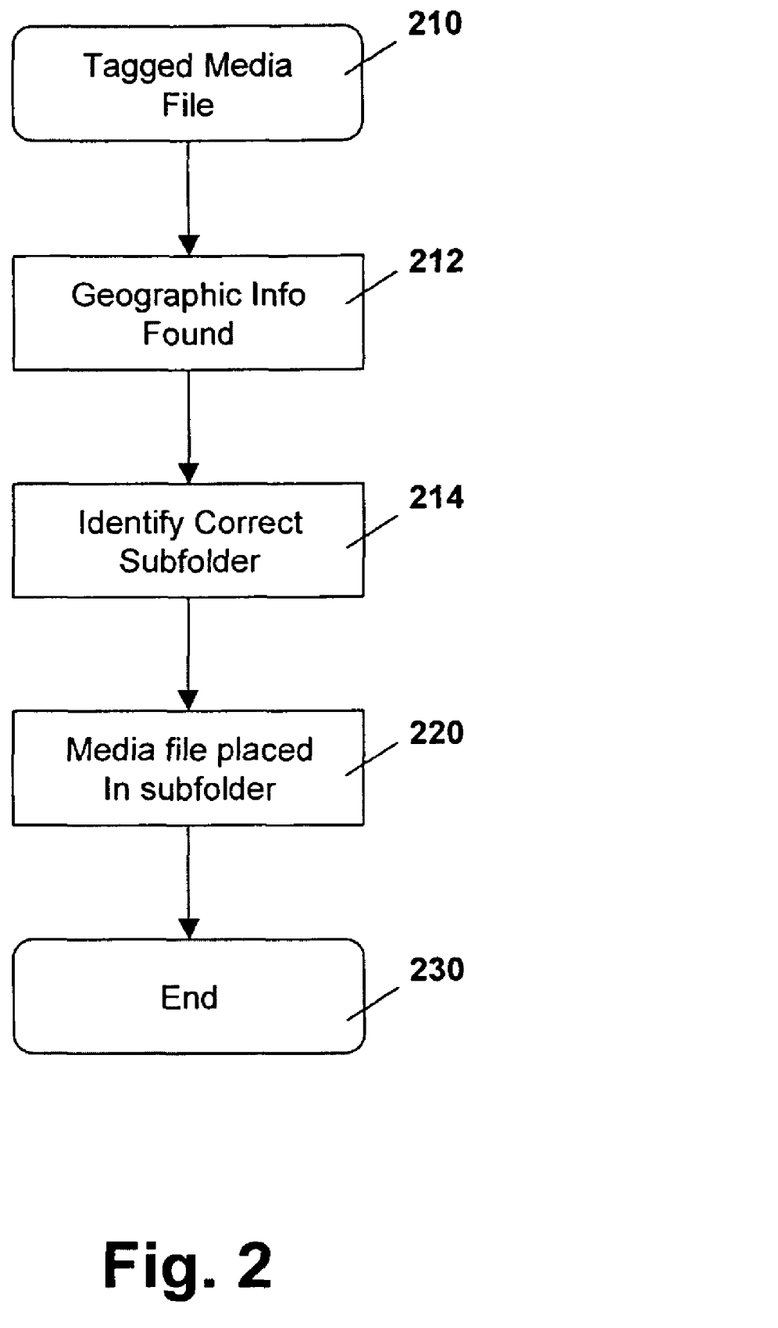
FIG. 2 is a flow diagram of a process for placing media files in subfolders.

Reference is now made to FIG. 2. FIG. 2 illustrates a method for organizing geo-tagged media files such as photographs into a folder system. Such a folder system could enable various functionality for the photographs for mapping and other applications as described below.

The process of FIG. 2 starts at block 210 in which a tagged media file exists. The process then proceeds to block 212 in which the geographic information is found. In some embodiments, this could include extracting the geographic information from the tagged media file. In other instances, the geographic information could be utilized during the tagging of the image file. In a further embodiment, the geographic information for each media file could be separately stored in a local centralized database on the device, rather than being embedded in the media file. For example, for video files no standard embedding technique exists, and thus an association in a database could be made. In this case, block 212 retrieves the geographic information from the centralized database.

The process then proceeds to block 214 in which a correct subfolder is identified for the tagged media file. This is generally referred to as reverse geo-coding or tagging.

In a virtual folder hierarchy, the process in block 214 is capable of identifying a subfolder for the tagged media file based on the tagged location of the file. For example, a directory structure could be created where a country could be the top level of the folder system.

Figure 3:
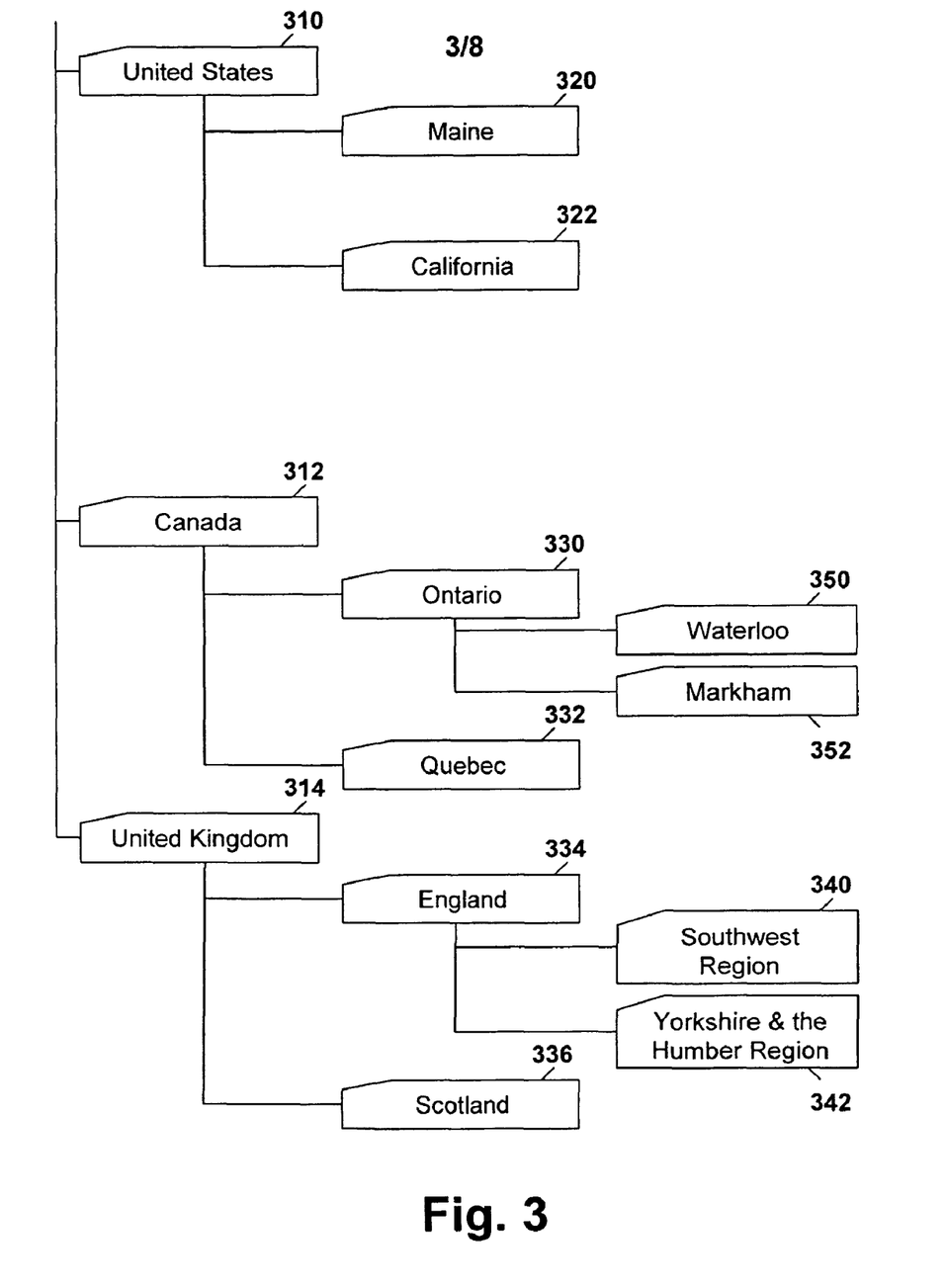
FIG. 3 is a diagram showing an exemplary subfolder tree for placement of media files.

Reference is made to FIG. 3. FIG. 3 shows a virtual directory system in which the top layer of the directory, as shown by boxes 310, 312 and 314, include various countries in which media files for the device exist. In the example of FIG. 3, a top level 310 is for the United States, 312 for Canada and 314 for the United Kingdom. Under this directory system, various subfolders could exist. For example, for the United States various subfolders could exist for the individual states. For example, in one embodiment, the folder 310 for the United States could include 50 subfolders to include every state in the United States. In alternative embodiments, the subfolders could be created only when the media files exist for the specific subfolder. Thus, in the alternative example, if a photograph is taken in the state of Maine, the United States folder 310 could be populated with a subfolder 320 which represents the state of Maine. A further picture could have been taken in California and thus a subfolder 322 is provided for the state of California.

Similarly, Canada can be divided into its various provinces including subfolder 330 for Ontario and 332 for Quebec.

In the example of FIG. 3, the United Kingdom could be divided into the various countries, such as 334 for England and 336 for Scotland. Each of these countries could be divided into the various regions of the countries such as the Southwest region or the Yorkshire and Humber region, shown as subfolders 340 and 342 respectively.

Various states, provinces or regions could also be then broken into smaller groupings. For example, Ontario could include a subfolder for a city such as Waterloo, which is shown as subfolder 350 in FIG. 3, or Markham, which is shown by subfolder 352. The determination of the boundaries of the City of Waterloo could be calculated in various ways including a certain distance from the centre of the city, various geographical bounding boxes among others.

As will be appreciated by those in the art, the directory structure as shown in FIG. 3 is merely meant as an example and indicates that various folders and subfolders of increasing granularity based on location could be created within a directory structure to place a tagged media file into an appropriate location. For example, provinces or states could be divided into regions, cities could be divided into neighborhoods, or streets, among others. In one embodiment, the folders or subfolders could be ordered alphabetically, such as for example listing Canada before the United States, or listing Alabama before Massachusetts in the subdirectory under the United States. In other embodiments, the folders or subfolders could be organized based on proximity to the current location of the device.

Referring back to FIG. 2, block 214 utilizes geographical areas as defined the memory of device 100 from FIG. 1. The process of FIG. 2 then proceeds to block 220 in which the media file is placed in the correct subfolder and the process ends at block 230.

For example, block 214 could determine that a picture was taken in Ottawa, Canada. If this is sufficient granularity, then block 214 could identify that the picture should be placed in subfolder "Ottawa", which is in subfolder "Ontario", which is in folder "Canada". If a higher granularity is required, the photo might be identified as belonging within the neighborhood of "Westboro", within the city of "Ottawa", within the region of "Eastern Ontario", within the province of "Ontario", within the country of "Canada", for example.

The granularity may be defined by the device, user, and applications on the device, among others. For example, a user can set the desired granularity within preferences on the mobile device. Thus, for example, a tourist might have sufficient granularity with the city, state and country. A real estate agent might however require photographs of listings to be organized by neighborhood or street.

Alternative, if an application utilizes geo-tagged photographs, it could have a default for the level of granularity it supports or requires. A composite of the various applications on mobile device could be created to create a setting for the required granularity.

The identification of the correct subfolder in block 214 could include passing the entire folder structure to block 220, or passing the subfolder only. In the latter case, if block 220 does not have the subfolder defined, it could request the subfolder hierarchy.

Figure 4:
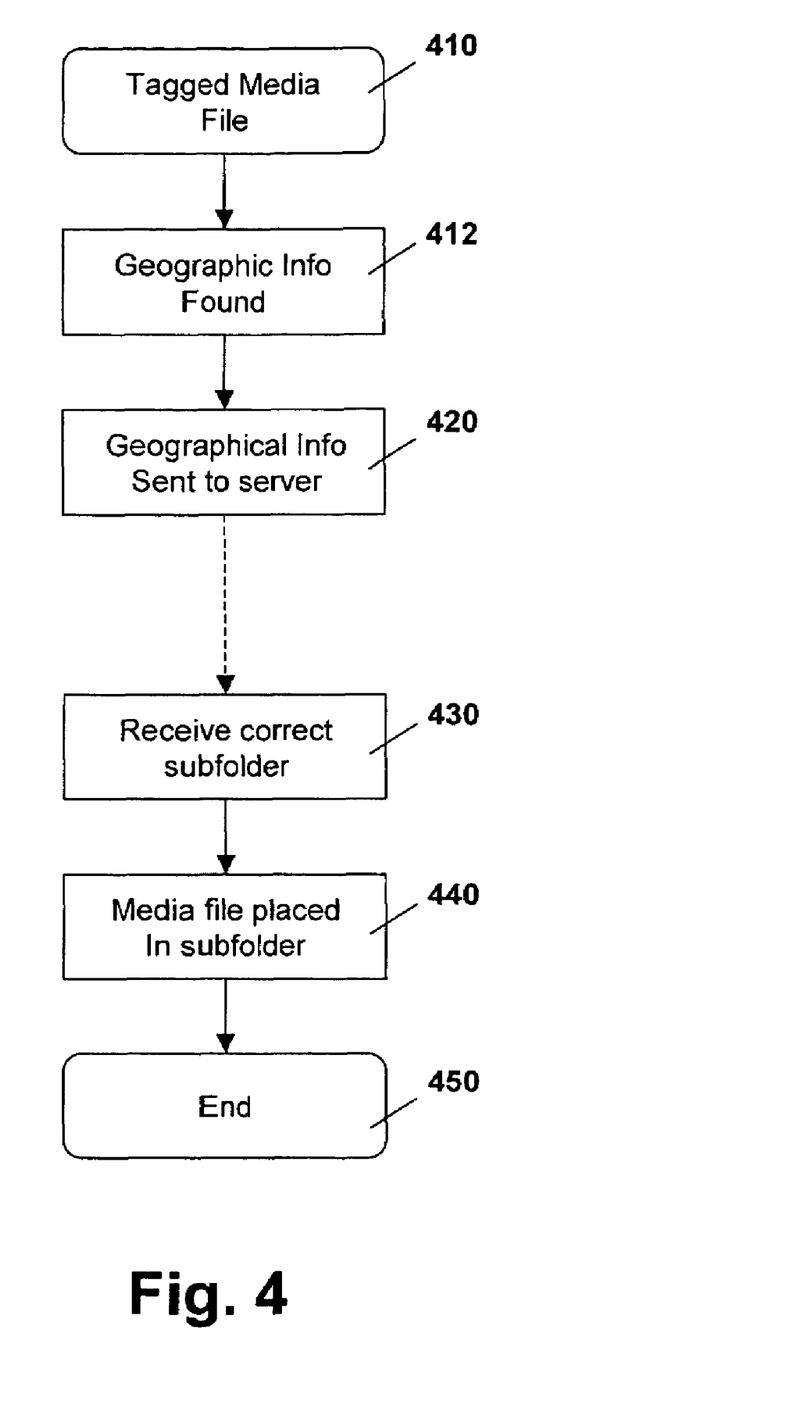
FIG. 4 is a flow diagram of a process for placing media files in subfolders utilizing a network server.

In an alternative configuration, the storing of various regional boundaries may be too memory and processor intensive for a mobile device. Reference is now made to FIG. 4. In FIG. 4 the process starts with block 410 in which a tagged media file is provided. The process then proceeds to block 412 in which the geographic information for the tagged media file is found, as with block 212 from FIG. 2. The process then proceeds to block 420 in which the geographical information is sent to a server on a network and in block 430 the correct subfolder is provided back to the mobile device.

The process then proceeds to block 440 in which the media file is placed in the correct subfolder and the process ends at block 450.

As will be appreciated, in the embodiment of FIG. 4, the server could be any network element which has the processing capabilities to process the geographic information provided and to return a subfolder or information concerning a subfolder back to the mobile device. The process of FIG. 4 reduces the processing and memory storage requirements on the device itself.

Figure 5:
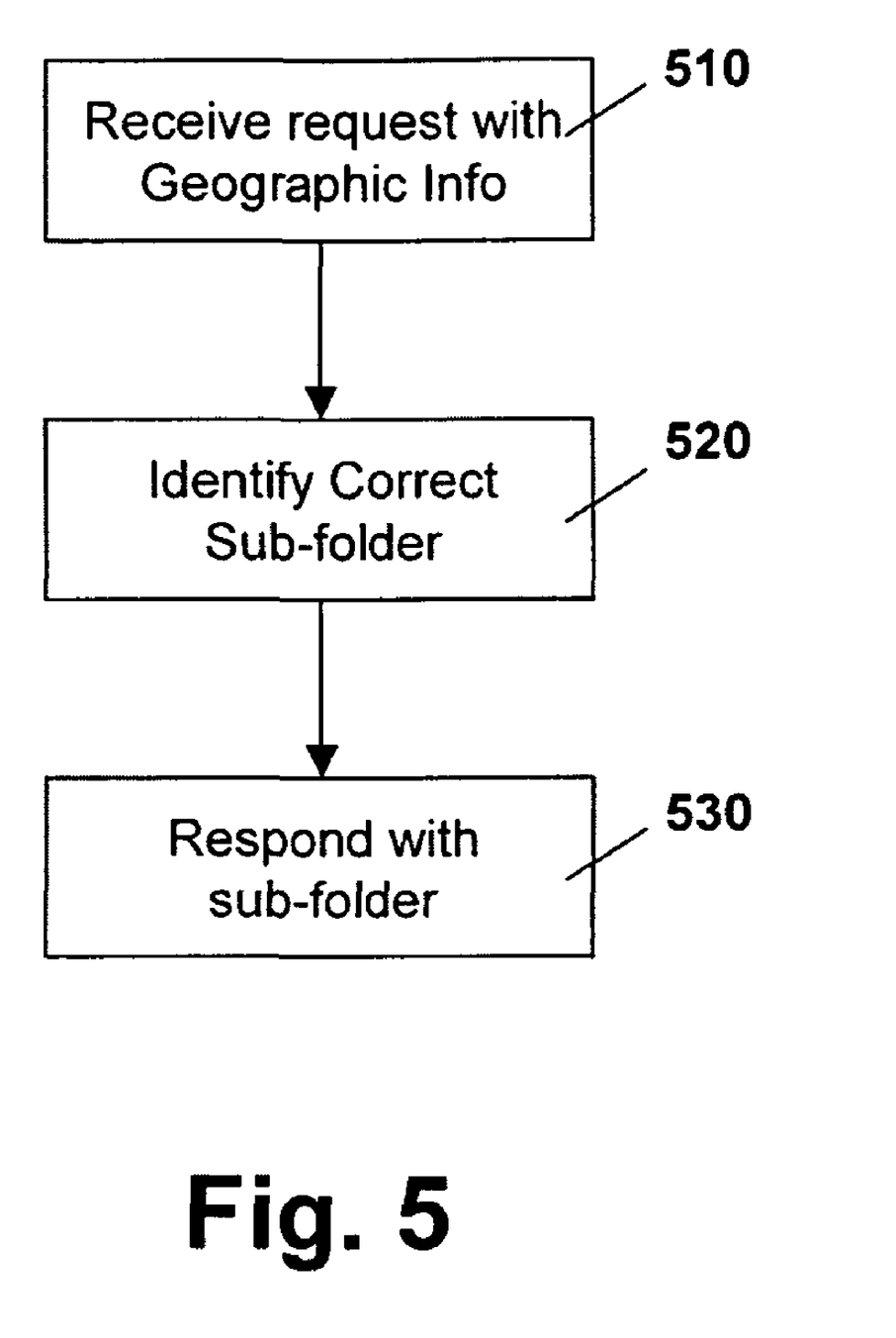
FIG. 5 is a flow diagram of a process on a network element for identifying a subfolder.

As a corollary to FIG. 4, reference is now made FIG. 5. FIG. 5 shows the process at a network element for processing the request from the user equipment. Specifically, the process begins at block 510 in which a request is received containing geographic information. The process then proceeds to block 520 in which a look-up is performed to determine the correct subfolder that the media should be placed in. The look-up of block 520 could be take various forms, and is similar to block 214 from FIG. 2 above. In one embodiment, the geographic location could be mapped to a specific set folder and subfolder configuration. For example, all user equipment that requests subfolders will receive a specific location-based subfolder for the same location.

In other embodiments, the subfolder structure that is returned to a user equipment could be dependent upon the user equipment. For example, a user may specify the level of granularity required for a media subfolder and the look-up of block 520 could provide the subfolder with the requested level of granularity.

In other embodiments, the requested level of granularity could be provided within the request received at block 510.

Further, the functionality of FIG. 5 could be distributed over various network elements. Thus, a look-up in block 520 could be performed by a different network element than the network element which received the request at block 510.

From block 520, the process proceeds to block 530 in which a response is sent back to the mobile device in order to provide the subfolder as requested.

The use of a subfolder could also be limited by various other factors, which could be sent in block 420, received in block 510 or identified in block 214 of FIGS. 4, 5 and 2 respectfully. For example, parameters could include a maximum number of media files within a subfolder before a new, higher resolution, subfolder is generated. At that point, the media files within the subfolder could be split into the various higher resolution subfolders according to geographical locations. Further, parameters as to what constitutes a subfolder, such as for example setting a radius for a location, could be specified in such messages. Thus a location could be defined as within 10 km of a central point, for example.

Further, the folder/subfolder hierarchy of FIG. 3 is merely meant to be illustrative. For example, no actual folder need be created on the device. In one embodiment, the folders and subfolders could be virtual, where labels could be added to the media files themselves in order to differentiate the media files in accordance with the virtual folder. The sorting by applications using the media files could then look for the added information to determine whether a photograph should be utilized.

In other cases, the virtual folder could be specified for or identified with a specific coordinate system or could be assigned a name.

Figure 6:
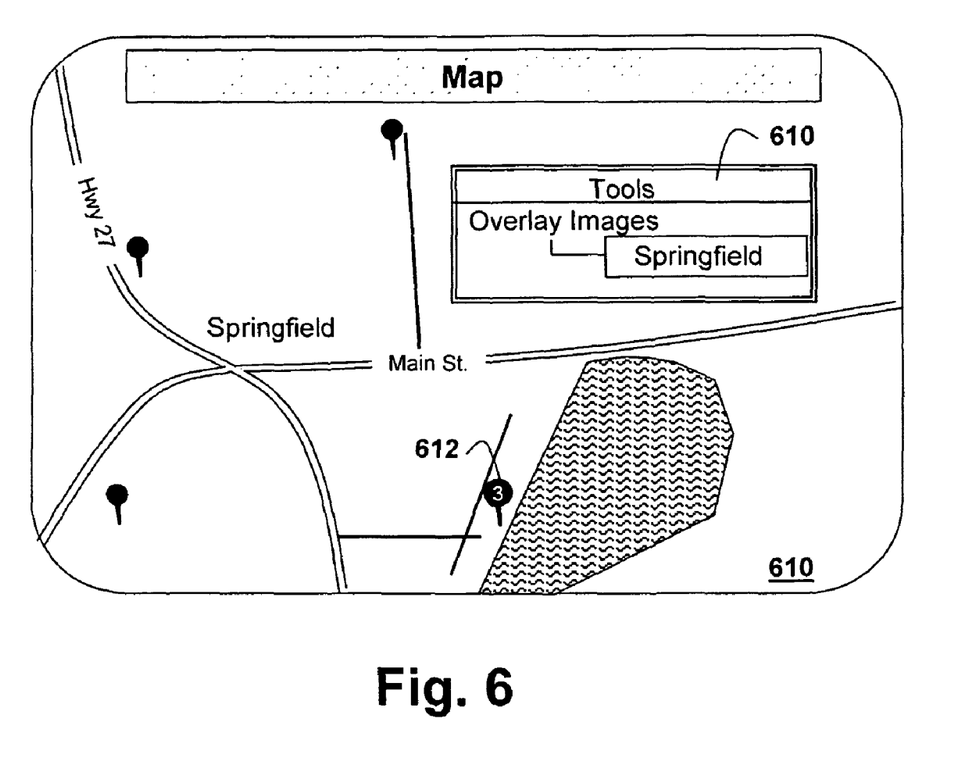
FIG. 6 is an exemplary display of a mapping application utilizing the methods of the present disclosure.

Use of the virtual folders or folder hierarchy as shown in FIG. 3 could be useful in a number of situations. In first situation, the use of the hierarchy could be useful for a mapping application. Reference is now made to FIG. 6.

FIG. 6 shows an exemplary screen of a mobile device in which a mapping application could be utilized and the geo-tagged media files could be overlaid over the mapping application as a type of layer. Thus, as shown in the reference to FIG. 6, a map 610 is provided with various geographic indicators such as roads, water or other features that would be known to those in the art. A menu provided for the application could indicate that one tool would be to overlay onto the map 610 images or an indication of an available image is provided, such as, for example, push pins 612, which may include content summaries, for instance, image counts as exemplified by the number "3" in the drawings. A user, wishing to overlay certain images or obtain an indication of available images, could choose a subfolder or folder based on a menu, such as 614, to display upon map 610.

In one example, a user has gone on a vacation in Southern Ontario. The user wants to show the pictures that she took during the vacation and can organize them by showing the overlay of images for Ontario.

The map application could select a map area based on the images in the subfolder and their geographic locations. For example, if the user selects to overlay the images that are in the folder Ontario but the user has only traveled to Southern Ontario, the map could provide an area slightly larger than the bounding area for the images contained in the subfolder. Such a selection of the resolution of the map being displayed is dynamic and could be done automatically.

Further, the user could select the location higher or lower on the subfolder hierarchy. Thus, instead of choosing "Ontario" the user could choose "Waterloo" and go to pictures that are within a specific radius of that city. When the user chooses Waterloo, the map 610 could, in one embodiment, resize to a bounding box that would fit all of the pictures within the "Waterloo" sub-folder. In this case, if the user has only taken pictures at the University of Waterloo, map 610 will show only streets around the University as opposed to the entire city of Waterloo.

Preset defaults for map size could exist where there is only one photograph within a specified geographic area.

Other options for overlaying images could indicate, for example, that the user wishes to view images that are within a set radius of a specific point. Such as the current location of the user. At this point, the user on the mobile device could choose images that are within the geographic radius of the selected location. Thus, a search routine on the mobile device or at the network server may need to look in multiple subfolders in order to determine whether or not images exist in those subfolders for the chosen radius. However, the organization of the photographs into subfolder still assists in limiting the number of photographs that need to be reviewed to determine whether they are within the geographic boundary.

In the example of FIG. 6, the availability of pictures or media files within the selected geographic area "Springfield" are represented as pushpins. If multiple pictures exist within a set resolution, the pushpin could include a number, such as for example the number three on the pushpin near the bottom center of the display. A user could then select a pushpin to have the picture enlarged, audio file played, movie shown, or other multimedia application utilized.

Besides the mapping application of FIG. 6, other media applications could also be utilized. Thus, in a picture application, the albums in the picture album could be sorted based on geographic location and, more specifically, based on folders and subfolders as indicated above with reference to FIG. 3. In this case, the photo album may show thumbnails of pictures within a geographic location which, in some instances, may be sorted based on the proximity to the user. Thus, the picture album application may open with a set of photographs representing photographs closest in geography to the user's current position. After that, the user may select in a menu to look at other albums based on, for example, a tree of the folders and subfolders.

In a further option, a menu could be provided to map the pictures based on each album. Thus, if a user is in an album depicting the Washington D.C. area, the user could, for example, select a "map it" menu selection and open a mapping application in which the geo-tagged pictures in the "Washington D.C." subfolder are mapped. Again, the area of the map that is displayed to a user could be dynamically determined based on the photographs in the "Washington D.C." folder and provided to the user as thumbnails or pushpins or other graphic representation. In one embodiment, if a folder contained more pictures than a preset threshold, a limit to the closest pictures geographically falling under the threshold could be set. Thus, for example, if a limit of 20 pictures is set, if a subfolder contains 54 pictures, only the closest 20 are displayed. The threshold could be set by a manufacturer, carrier or user.

Figure 7:
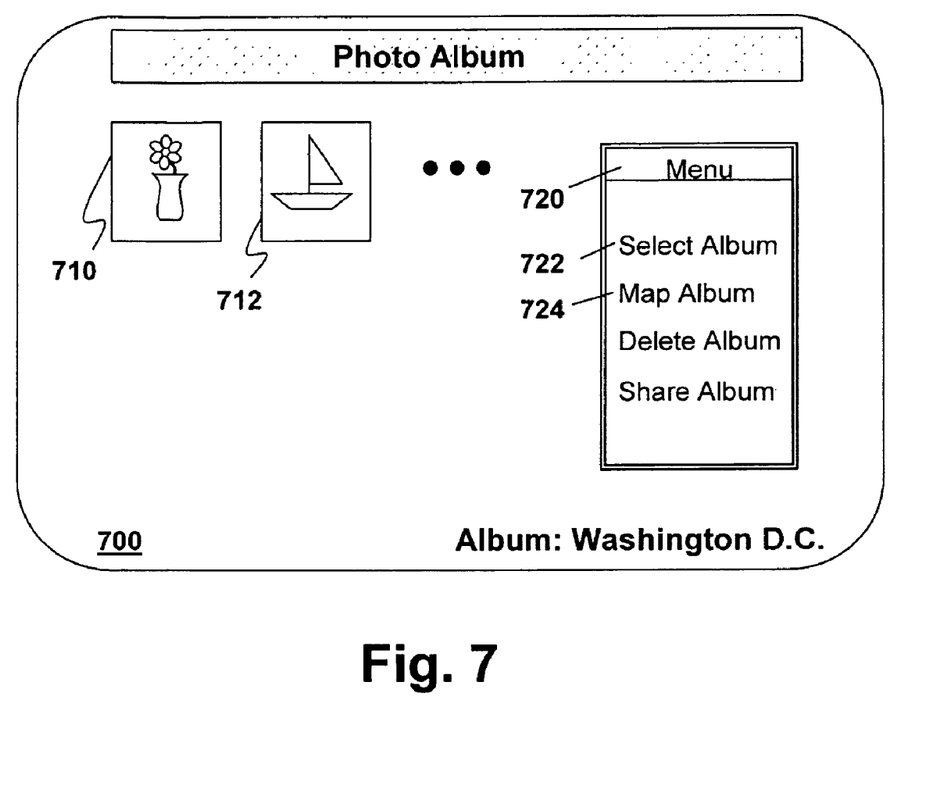
FIG. 7 is an exemplary display of a photo album utilizing the methods of the present disclosure.

Reference is now made to FIG. 7. FIG. 7 illustrates a screen capture of an exemplary photo album application 700 in which photographs 710 and 712 are illustrated as examples. The number of pictures in a specific album is not limited by the present application.

Further, pressing a specific key may for example, show a menu 720. The user may be allowed to select a particular album from the virtual folders, as shown by menu selection 722. A user clicking on selection 722 would be provided, for example, with the folder/subfolder tree.

In a further embodiment, a menu selection 724 may be provided to map the geo-tagged photographs in the photo album of FIG. 7. The selection of menu selection 724 could cause a map application or client to be started and the pictures displayed as shown by FIG. 6.

In a further alternative embodiment, rather then merely having folders and subfolders that are based on geography, other folders could be introduced to enable a user to sort the media files. Thus, for example, instead of having a country as the top folder, instead a user may create various top level folders such as "business" and "personal" among others. Thereafter, when a user takes a picture the picture can be placed into a folder based on a user selection, for example, by prompting the user, or into a default folder unless the folder is chosen otherwise by the user.

If a user puts a picture into the "business" folder, a subfolder structure could thereafter be created to sort by, for example, country, state and city. Other alternatives would be to, for example, sort business photographs by locations. Thus, if a user is taking photographs of various factories during a business trip, the subfolders under business may involve a geographic location proximate to the factory that the user is viewing. This could be specified on the mobile device or on the network element prior to or during a business trip in order to sort the geo-tagged photographs into their various locations.

In a further alternative embodiment, the map application as shown by FIG. 6 could be utilized to move to a particular geographic location. At that point the user may request that photographs within the screen area be displayed. The map application would then proceed to the various subfolders which contain photographs that are part of the displayed area and could produce thumbnails, pushpins or other views for these photographs.

A further application that may be relevant could, for example, include a navigation application in which the navigation application access relevant folders or subfolders in a virtual directory to provide geo-tagged media files on a route that a user is navigating.

The above therefore provides a way to browse multiple photo locations on a map. When browsing a folder library containing multiple photo files in the photo browser application, a "view photo's on map" menu command may be available to a user. Upon invocation, a map is displayed, populated by landmark pushpins or thumbnails corresponding to locations of the photos within the current folder of a virtual folder directory. These locations for the thumbnails or pushpins are read from geo-tags embedded in the photographs or media files.

Further, in one embodiment, locations may be additionally cached in an index for quicker read access. This allows an application accessing a particular location frequently to run more efficiently.

A user of a mobile device is able to navigate between photo locations in one embodiment by pressing various keys, for example, going to the next photograph or the previous photograph. Each location is depicted by either a generic pushpin, optionally labeled with a file name, or a thumbnail image representing the photograph.

The above provides for default map view which is set to a zoom level such that all locations fit within the display. Also, the user has the option of selecting specific images in the photo browser and viewing only the selected images located on the map. Thus, instead of viewing all of the photographs within a subfolder, a specific subset could be selected manually and then displayed on the map.

In a further embodiment, it is possible to view photo locations from alternative entry points. The user may enter a map application first and based on a geographic location the user can then select an "any photographs" command to query the media database for any photographs that are geo-tagged with locations corresponding to a current map display. If such photographs exist they can appear as landmarks in the current view in a similar fashion as described above.

In further alternatives, the mapping application could have the ability to select a specific subfolder as an album, which would then be displayed as a photo layer on top of the mapping application. This may be considered a rich data layer that can be individually toggled on the map at any time.

The present disclosure could be performed on any mobile device or non-mobile device. If performed on a mobile device, one exemplary mobile device is illustrated below with reference to FIG. 8.

Figure 8:
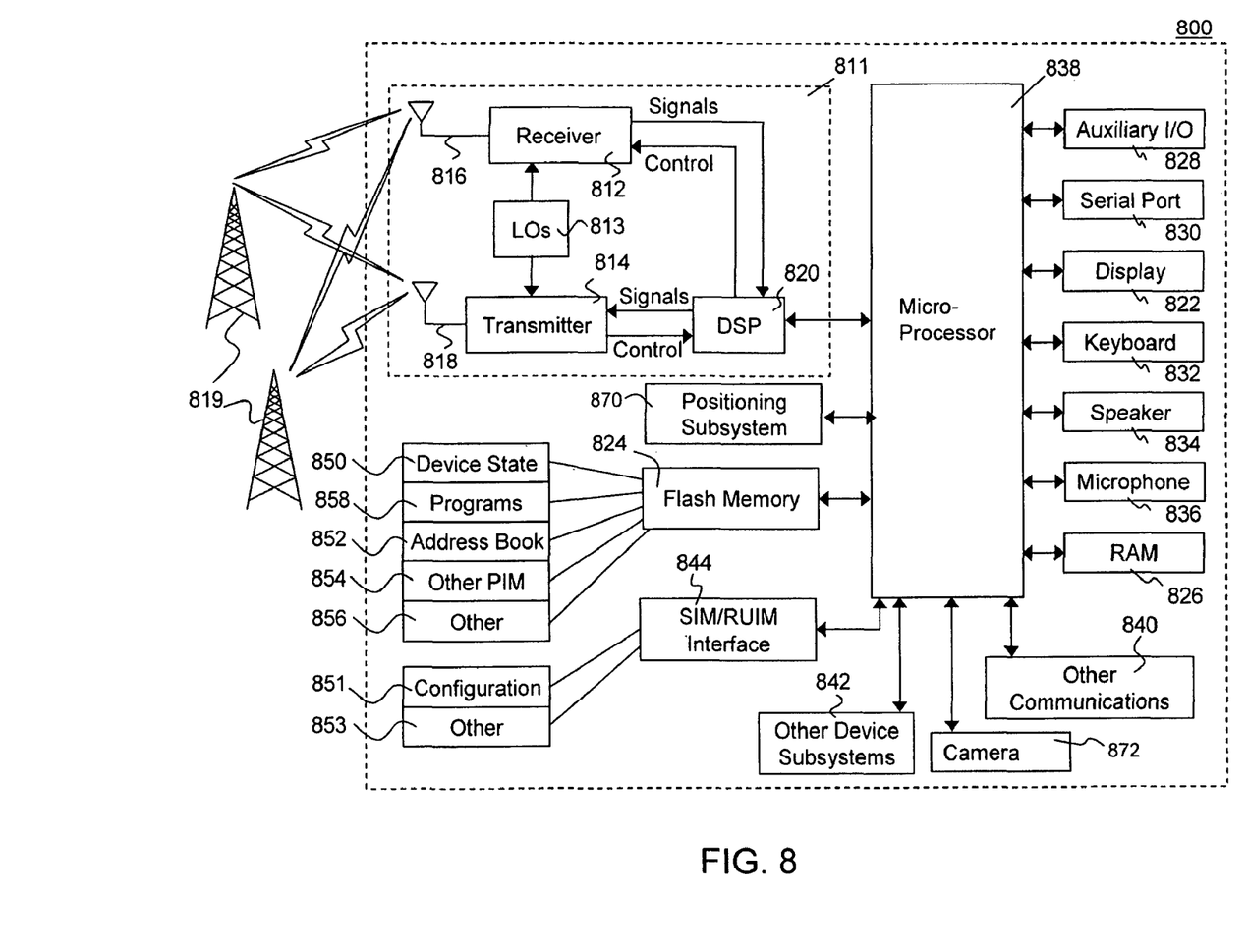
FIG. 8 is a block diagram of an exemplary mobile device.

Mobile device 800 is preferably a two-way wireless communication device having at least voice and data communication capabilities. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile device 800 is enabled for two-way communication, it will incorporate a communication subsystem 811, including both a receiver 812 and a transmitter 814, as well as associated components such as one or more, preferably embedded or internal, antenna elements 816 and 818, local oscillators (LOs) 813, and a processing module such as a digital signal processor (DSP) 820. As will be apparent to those skilled in the field of communications, the particular design of the communication subsystem 811 will be dependent upon the communication network in which the device is intended to operate.

Network access requirements will also vary depending upon the type of network 819. In some CDMA networks network access is associated with a subscriber or user of mobile device 800. A CDMA mobile device may require a removable user identity module (RUIM) or a subscriber identity module (SIM) card in order to operate on a CDMA network. The SIM/RUIM interface 844 is normally similar to a card-slot into which a SIM/RUIM card can be inserted and ejected like a diskette or PCMCIA card. The SIM/RUIM card hold many key configuration 851, and other information 853 such as identification, and subscriber related information.

When required network registration or activation procedures have been completed, mobile device 800 may send and receive communication signals over the network 819. As illustrated in FIG. 8, network 819 can consist of multiple base stations communicating with the mobile device. For example, in a hybrid CDMA 1×EVDO system, a CDMA base station and an EVDO base station communicate with the mobile station and the mobile device is connected to both simultaneously. The EVDO and CDMA 1× base stations use different paging slots to communicate with the mobile device.

Signals received by antenna 816 through communication network 819 are input to receiver 812, which may perform such common receiver functions as signal amplification, frequency down conversion, filtering, channel selection and the like, and in the example system shown in FIG. 8, analog to digital (A/D) conversion. A/D conversion of a received signal allows more complex communication functions such as demodulation and decoding to be performed in the DSP 820. In a similar manner, signals to be transmitted are processed, including modulation and encoding for example, by DSP 820 and input to transmitter 814 for digital to analog conversion, frequency up conversion, filtering, amplification and transmission over the communication network 819 via antenna 818. DSP 820 not only processes communication signals, but also provides for receiver and transmitter control. For example, the gains applied to communication signals in receiver 812 and transmitter 814 may be adaptively controlled through automatic gain control algorithms implemented in DSP 820.

Mobile device 800 preferably includes a microprocessor 838 which controls the overall operation of the device. Communication functions, including at least data and voice communications, are performed through communication subsystem 811. Microprocessor 838 also interacts with further device subsystems such as the display 822, flash memory 824, random access memory (RAM) 826, auxiliary input/output (I/O) subsystems 828, serial port 830, one or more keyboards or keypads 832, speaker 834, microphone 836, other communication subsystem 840 such as a short-range communications subsystem and any other device subsystems generally designated as 842. A camera 872 may optionally be provided on mobile device 800. Further, a positioning subsystem 872 may be provided.

Serial port 830 could include a USB port or other port known to those in the art.

Some of the subsystems shown in FIG. 8 perform communication-related functions, whereas other subsystems may provide "resident" or on-device functions. Notably, some subsystems, such as keyboard 832 and display 822, for example, may be used for both communication-related functions, such as entering a text message for transmission over a communication network, and device-resident functions such as a calculator or task list.

Operating system software used by the microprocessor 838 is preferably stored in a persistent store such as flash memory 824, which may instead be a read-only memory (ROM) or similar storage element (not shown). Those skilled in the art will appreciate that the operating system, specific device applications, or parts thereof, may be temporarily loaded into a volatile memory such as RAM 826. Received communication signals may also be stored in RAM 826.

As shown, flash memory 824 can be segregated into different areas for both computer programs 858 and program data storage 850, 852, 854 and 856. These different storage types indicate that each program can allocate a portion of flash memory 824 for their own data storage requirements. Microprocessor 838, in addition to its operating system functions, preferably enables execution of software applications on the mobile device. A predetermined set of applications that control basic operations, including data and voice communication applications for example, will normally be installed on mobile device 800 during manufacturing. Other applications could be installed subsequently or dynamically.

A preferred software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application would preferably have the ability to send and receive data items, via the wireless network 819. In a preferred embodiment, the PIM data items are seamlessly integrated, synchronized and updated, via the wireless network 819, with the mobile device user's corresponding data items stored or associated with a host computer system. Further applications may also be loaded onto the mobile device 800 through the network 819, an auxiliary I/O subsystem 828, serial port 830, short-range communications subsystem 840 or any other suitable subsystem 842, and installed by a user in the RAM 826 or preferably a non-volatile store (not shown) for execution by the microprocessor 838. Such flexibility in application installation increases the functionality of the device and may provide enhanced on-device functions, communication-related functions, or both. For example, secure communication applications may enable electronic commerce functions and other such financial transactions to be performed using the mobile device 800.

In a data communication mode, a received signal such as a text message or web page download will be processed by the communication subsystem 811 and input to the microprocessor 838, which preferably further processes the received signal for output to the display 822, or alternatively to an auxiliary I/O device 828.

A user of mobile device 800 may also compose data items such as email messages for example, using the keyboard 832, which could be a complete alphanumeric keyboard or telephone-type keypad, in conjunction with the display 822 and possibly an auxiliary I/O device 828. Such composed items may then be transmitted over a communication network through the communication subsystem 811.

For voice communications, overall operation of mobile device 800 is similar, except that received signals would preferably be output to a speaker 834 and signals for transmission would be generated by a microphone 836. Alternative voice or audio I/O subsystems, such as a voice message recording subsystem, may also be implemented on mobile device 800. Although voice or audio signal output is preferably accomplished primarily through the speaker 834, display 822 may also be used to provide an indication of the identity of a calling party, the duration of a voice call, or other voice call related information for example.

Serial port 830 in FIG. 8, would normally be implemented in a personal digital assistant (PDA)-type mobile device for which synchronization with a user's desktop computer (not shown) may be desirable, but is an optional device component. Such a port 830 would enable a user to set preferences through an external device or software application and would extend the capabilities of mobile device 800 by providing for information or software downloads to mobile device 800 other than through a wireless communication network. The alternate download path may for example be used to load an encryption key onto the device through a direct and thus reliable and trusted connection to thereby enable secure device communication. As will be appreciated by those skilled in the art, serial port 830 can further be used to connect the mobile device to a computer to act as a modem.

Other communications subsystems 840, such as a short-range communications subsystem, is a further optional component which may provide for communication between mobile device 800 and different systems or devices, which need not necessarily be similar devices. For example, the subsystem 840 may include an infrared device and associated circuits and components or a Bluetooth™ communication module to provide for communication with similarly enabled systems and devices.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method for organizing a geographically tagged media file comprising:
   obtaining, at a processor on a mobile device, geographical information for the geographically tagged media file;
   identifying a subfolder for the geographically tagged media file based on the obtained geographical information, the identifying comprises sending a request to a network element containing the obtained geographical information and receiving a response containing the identified subfolder, the request further includes a granularity level desired; and
   placing the geographically tagged media file in the identified subfolder on the mobile device.

2. The method of claim 1 wherein the identifying comprises looking within a local memory repository for a subfolder corresponding to the obtained geographical information.

3. The method of claim 1 wherein the subfolder is located within a tree having varied levels of geographic granularity.

4. The method of claim 1, wherein the subfolder is part of a tree with a user defined root.

5. The method of claim 1, wherein the geographically tagged media file is selected from the group comprising a photograph; a video file; and an audio file.

6. A method for organizing a geographically tagged media file comprising:
   obtaining, at a processor on a mobile device, geographical information for the geographically tagged media file;
   identifying a subfolder for the geographically tagged media file based on the obtained geographical information;
   placing the geographically tagged media file in the identified subfolder on the mobile device; and
   breaking the subfolder into multiple subfolders if a predetermined number of media files within the subfolder is exceeded.

7. The method of claim 6, wherein the identifying comprises looking within a local memory repository for a subfolder corresponding to the obtained geographical information.

8. The method of claim 6, wherein the subfolder is located, within a tree having varied levels of geographic granularity.

9. The method of claim 6, wherein the subfolder is part of a tree with a user defined root.

10. The method of claim 6, wherein the geographically tagged media file is selected from the group comprising a photograph; a video file; and an audio file.

11. A method for utilizing an album of geographically tagged media files within a media application, the method comprising:
    allowing, by a processor on a mobile device, a third party application access to the geographically tagged media files, the third party application is a mapping application; and
    upon selection of the mapping application within, the media application, launching by the mobile device the mapping application populated with the album of geographically tagged media files, the launching of the mapping application overlays the album of geographically tagged media files as an image layer over the mapping application.

12. The method of claim 11, wherein the mapping application dynamically adjusts a map screen size based on geographical information in the album.

13. The method of claim 11, wherein the geographically tagged media files are represented in the mapping application as pushpins or thumbnail images.

14. A mobile device configured to utilize an album of geographically tagged media files within a media application, the mobile device comprising:
 a user interface; and
 a processor configured to:
  allow a third party application access to the geographically tagged media files, the third party application is a mapping application; and
  upon selection of the mapping application within the media application, launching the mapping application populated with the album of geographically tagged media files, the launching of the mapping application overlays the album of geographically tagged media files as an image layer over the mapping application.

15. The mobile device of claim 14, wherein the mapping application dynamically adjusts a map screen size on the user interface based on geographical information in the album.

16. The mobile device of claim 14, wherein the geographically tagged media files are represented in the mapping application as pushpins or thumbnail images on the user interface.

* * * * *